US008736819B2

(12) United States Patent
Nagai (10) Patent No.: US 8,736,819 B2
(45) Date of Patent: May 27, 2014

(54) DISTANCE MEASURING INSTRUMENT

(75) Inventor: Katsuyuki Nagai, Tokyo-to (JP)

(73) Assignee: Kabushiki Kaisha TOPCON, Tokyo-to (JP)

(*) Notice: Subject to any disclaimer, the term of this patent is extended or adjusted under 35 U.S.C. 154(b) by 338 days.

(21) Appl. No.: 13/197,078

(22) Filed: Aug. 3, 2011

(65) Prior Publication Data

US 2012/0081692 A1 Apr. 5, 2012

(30) Foreign Application Priority Data

Sep. 30, 2010 (JP) ................................. 2010-220349

(51) Int. Cl.
  G01C 3/08 (2006.01)
  G01S 7/489 (2006.01)
  G01S 17/08 (2006.01)
  G01S 7/486 (2006.01)

(52) U.S. Cl.
  CPC ............... *G01S 7/489* (2013.01); *G01S 7/4868* (2013.01); *G01C 3/08* (2013.01); *G01S 17/08* (2013.01)
  USPC ...................................................... 356/5.01

(58) Field of Classification Search
  CPC ........ G01S 7/497; G01S 7/4868; G01S 7/489
  USPC ........................................................ 356/4.07
  See application file for complete search history.

(56) References Cited

U.S. PATENT DOCUMENTS

| | | | | |
|---|---|---|---|---|
| 3,836,256 A | * | 9/1974 | Peters | 356/508 |
| 4,005,937 A | * | 2/1977 | Barrett | 356/454 |
| 4,171,910 A | * | 10/1979 | Derderian et al. | 356/124 |

(Continued)

FOREIGN PATENT DOCUMENTS

| | | |
|---|---|---|
| CN | 1712989 A | 12/2005 |
| CN | 1768435 A | 5/2006 |

(Continued)

OTHER PUBLICATIONS

Hui Tian ; Boyd A. Fowler and Abbas El Gamal. "Analysis of temporal noise in CMOS APS", Proc. SPIE 3649, Sensors, Cameras, and Systems for Scientific/Industrial Applications, 177 (Apr. 27, 1999); doi:10.1117/12.347073; http://dx.doi.org/10.1117/12.347073.*

(Continued)

*Primary Examiner* — Luke Ratcliffe
*Assistant Examiner* — Ari M Diacou
(74) *Attorney, Agent, or Firm* — Nields, Lemack & Frame, LLC (57) ABSTRACT

The invention provides a distance measuring instrument, comprising a light emitting unit 13 for emitting a distance measuring light, a photodetecting unit 14 for receiving and detecting a reflected distance measuring light from an object to be measured and a part of the distance measuring light emitted from the light emitting unit as an internal reference light, a sensitivity adjusting unit 23 for electrically adjusting photodetecting sensitivity of the photodetecting unit, and a control arithmetic unit 22 for calculating a measured distance based on a photodetection signal of the reflected distance measuring light from the photodetecting unit and based on a photodetection signal of the internal reference light, wherein the control arithmetic unit can measure a distance by selecting a prism mode measurement and a non-prism mode measurement, and controls so that photodetecting sensitivity of the photodetecting unit is changed by the sensitivity adjusting unit in response to the selected measurement mode.

10 Claims, 4 Drawing Sheets

(56) References Cited

U.S. PATENT DOCUMENTS

| | | | |
|---|---|---|---|
| 4,469,443 A * | 9/1984 | Geller | 356/364 |
| 4,799,791 A * | 1/1989 | Echizen et al. | 356/121 |
| 4,909,629 A * | 3/1990 | Yokokura et al. | 356/482 |
| 5,317,375 A * | 5/1994 | Omamyuda et al. | 356/5.13 |
| 5,359,415 A * | 10/1994 | Tabarelli | 356/482 |
| 6,055,490 A * | 4/2000 | Dunne | 702/159 |
| 6,226,076 B1 * | 5/2001 | Yoshida | 356/5.06 |
| 6,310,682 B1 * | 10/2001 | Gavish et al. | 356/5.01 |
| 6,400,447 B1 * | 6/2002 | Kirk et al. | 356/4.07 |
| 6,411,371 B1 | 6/2002 | Hinderling et al. | |
| 6,753,951 B2 * | 6/2004 | Fukumoto | 356/4.01 |
| 6,803,593 B2 * | 10/2004 | Ohishi et al. | 250/559.29 |
| 7,564,538 B2 * | 7/2009 | Sakimura et al. | 356/4.01 |
| 7,715,009 B1 * | 5/2010 | Myers et al. | 356/436 |
| 8,416,396 B2 * | 4/2013 | Parker | 356/3 |
| 2002/0008866 A1 * | 1/2002 | Ohtomo et al. | 356/5.1 |
| 2002/0185618 A1 * | 12/2002 | Ohishi et al. | 250/559.38 |
| 2003/0086072 A1 * | 5/2003 | Fukumoto et al. | 356/4.01 |
| 2003/0206292 A1 * | 11/2003 | Some | 356/237.1 |
| 2004/0195493 A1 | 10/2004 | Hashimoto et al. | |
| 2004/0246461 A1 * | 12/2004 | Ohtomo et al. | 356/4.01 |
| 2007/0114405 A1 * | 5/2007 | Oosaki et al. | 250/310 |
| 2008/0055446 A1 * | 3/2008 | Hunter et al. | 348/308 |
| 2008/0231830 A1 * | 9/2008 | Osada | 356/4.07 |

FOREIGN PATENT DOCUMENTS

| | | | |
|---|---|---|---|
| CN | 101153913 A | | 4/2008 |
| JP | 57022538 A | * | 2/1982 |
| JP | 2004-507742 A | | 3/2004 |
| JP | 2004-309310 A | | 11/2004 |
| JP | 3906818 B2 | | 4/2007 |
| JP | 2009-109210 A | | 5/2009 |
| JP | 4332255 B2 | | 9/2009 |

OTHER PUBLICATIONS

Canon Dale. Could a "virtual ND filter" (i.e. super-low ISO) be implemented in a camera? Feb. 10, 2010. http://photography-on-the.net/forum/archive/index.php/t-824922.html. Downloaded on Sep. 25, 2013.*

Nick Stubbs. Photography—ISO, What it Means and What it Does. www.all-things-photography.com/iso.html. Uploaded (according to google.com): Nov 17, 2006. Retrieved snapshot from Wayback Machine from Mar. 8, 2009. http://web.archive.org/web/20090308132056/http://www.all-things-photography.com/iso.html.*

Chinese Communication, with English translation, issued Sep. 29, 2013 in corresponding Chinese patent application No. CN 201110206341.0.

* cited by examiner

| | HORIZONTAL DEVIATION ANGLE (′) | | | | |
|---|---|---|---|---|---|
| VERTICAL DEVIATION ANGLE (′) | -2 | -1 | 0 | 1 | 2 |
| 2 | | | | | |
| 1 | | -0.20 | 0.45 | 0.64 | |
| 0 | | -0.35 | 0.00 | 0.56 | |
| -1 | | -1.20 | -0.56 | -0.30 | |
| -2 | | | | | |

FIG.3B
RV85%

| | HORIZONTAL DEVIATION ANGLE (′) | | | | |
|---|---|---|---|---|---|
| VERTICAL DEVIATION ANGLE (′) | -2 | -1 | 0 | 1 | 2 |
| 2 | | | 0.15 | | |
| 1 | | 0.06 | 0.10 | 0.28 | |
| 0 | -0.23 | -0.19 | 0.00 | 0.11 | 0.20 |
| -1 | | -0.41 | -0.07 | -0.11 | |
| -2 | | | -0.20 | | |

FIG.3C
RV83%

| | HORIZONTAL DEVIATION ANGLE (′) | | | | |
|---|---|---|---|---|---|
| VERTICAL DEVIATION ANGLE (′) | -2 | -1 | 0 | 1 | 2 |
| 2 | | | 0.18 | | |
| 1 | | 0.04 | 0.24 | 0.30 | |
| 0 | -0.14 | -0.08 | 0.00 | 0.09 | 0.25 |
| -1 | | -0.26 | -0.03 | -0.05 | |
| -2 | | | -0.18 | | |

FIG.3D
RV81%

| | HORIZONTAL DEVIATION ANGLE (′) | | | | |
|---|---|---|---|---|---|
| VERTICAL DEVIATION ANGLE (′) | -2 | -1 | 0 | 1 | 2 |
| 2 | | | 0.08 | | |
| 1 | | 0.14 | 0.22 | 0.18 | |
| 0 | -0.06 | -0.12 | 0.00 | 0.10 | 0.22 |
| -1 | | -0.18 | 0.00 | 0.20 | |
| -2 | | | -0.22 | | |

FIG.3E
RV79%

| | HORIZONTAL DEVIATION ANGLE (′) | | | | |
|---|---|---|---|---|---|
| VERTICAL DEVIATION ANGLE (′) | -2 | -1 | 0 | 1 | 2 |
| 2 | | | 0.20 | | |
| 1 | | 0.06 | 0.15 | 0.08 | |
| 0 | -0.16 | 0.02 | 0.00 | -0.08 | 0.06 |
| -1 | | -0.22 | -0.11 | 0.10 | |
| -2 | | | 0.02 | | |

FIG.3F
RV77%

| | HORIZONTAL DEVIATION ANGLE (′) | | | | |
|---|---|---|---|---|---|
| VERTICAL DEVIATION ANGLE (′) | -2 | -1 | 0 | 1 | 2 |
| 2 | | | 0.16 | | |
| 1 | | 0.06 | -0.11 | 0.18 | |
| 0 | -0.14 | 0.11 | 0.00 | 0.10 | 0.18 |
| -1 | | 0.08 | 0.16 | 0.22 | |
| -2 | | | 0.04 | | |

FIG.4

DISTANCE MEASURING INSTRUMENT

BACKGROUND OF THE INVENTION

The present invention relates to a measuring instrument, by which it is possible to measure a distance to an object to be measured by projecting a distance measuring light to the object to be measured and by receiving a reflection light from the object to be measured.

As the method to measure a distance to an object to be measured by an electronic distance measuring instrument, there are two methods. One method is a method of measurement to use a prism, in which a prism is installed at a measuring position, and a distance measuring light reflected by the prism is received by using the prism as an object, and the distance is measured. Another method is a method of measurement on non-prism mode not to use a prism, in which a distance measuring light is directly projected to the object to be measured and the distance is measured by receiving a reflection light from the object to be measured.

In case the measurement is performed by using the prism, reflectivity of the prism is high, and a reflection light with high light amount is obtained. Thus, the measurement can be performed on a long distance. In contrast, in case of the non-prism mode, there is no need to install the prism each time at the measuring position, and distance measurement can be performed simply, but the reflected light amount is lower, and it is not possible to measure a long distance. Therefore, more preferably, it should be so designed that the measurement mode can be selected adequately to suit the situation of the measurement.

Figure 4:
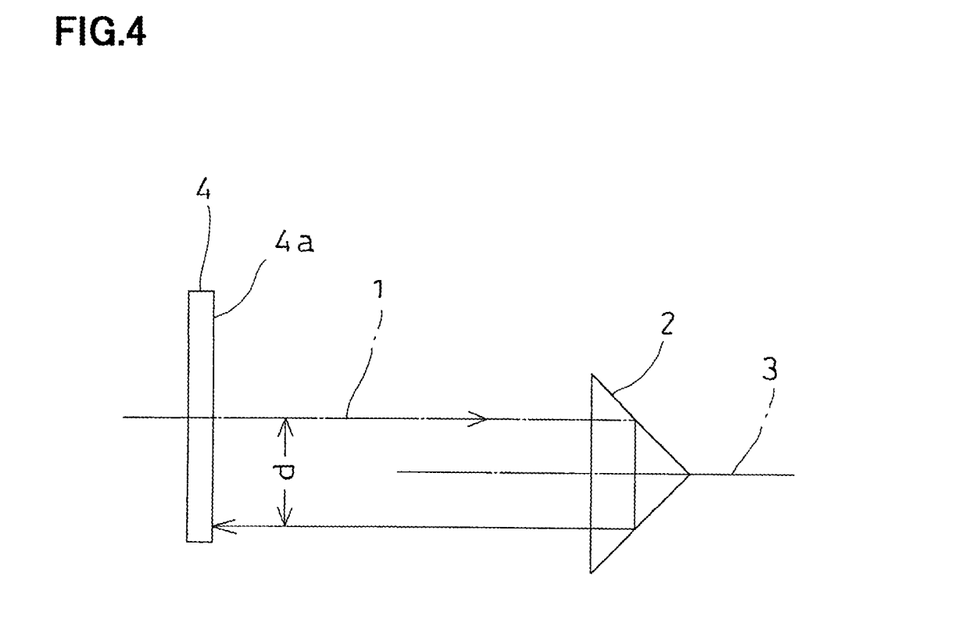
FIG. 4 is a schematical drawing to explain a case where a distance measuring optical axis is deviated from a center of the prism in the measuring method using the prism.

Next, in the measurement mode using the prism, as shown in FIG. 4, in case a distance measuring optical axis 1 is deviated from a prism optical axis 3 of a prism 2, or in case the distance measuring optical axis 1 is deviated from a center of the prism 2, a distance measuring light reflected by the prism 2 (hereinafter referred as "reflected distance measuring light") is deviated from the distance measuring optical axis 1. For this reason, at a photodetecting unit 4 for receiving the reflected distance measuring light, the light receiving position is deviated by an amount of "d" from a standard position (i.e. a position, which corresponds to the distance measuring optical axis).

When it is seen from the viewpoint of manufacture, the photodetecting unit 4 does not necessarily have uniform sensitivity or responsiveness over total surface of the light receiving surface, and the sensitivity or the responsiveness differs according to each point on the light receiving surface. For this reason, when the distance measuring optical axis 1 is deviated from the prism optical axis 3, there is a case that the responsiveness of a photodetection signal from the photodetecting unit 4 may differ according to the light receiving position of the light receiving surface 4a. When the responsiveness of the photodetection signal differs, the difference of responsiveness appears as an error in the value of the measured distance when the distance is measured.

Therefore, the deviation of the distance measuring optical axis 1 from the prism optical axis 3 becomes a factor of an error in the measurement. Meanwhile, as cases where the prism optical axis 3 is deviated from the distance measuring optical axis 1, there are a case where the distance measuring instrument has automatic sighting function and sighting error is caused when sighting is performed sequentially, a case where there is a heat haze in an atmosphere when a long distance is measured, a case where there is sighting error caused by a surveying operator, and other cases. On the other hand, there may be a request from a customer side that, even when the distance measuring optical axis 1 is deviated from the prism optical axis 3, the distance measurement accuracy must be at a predetermined value or lower until an amount of the deviation between the distance measuring optical axis 1 and the prism optical axis 3 reaches a predetermined value.

In the past, when there has been such a request from the customer side, it has been practiced that a photodetecting unit 4 of high quality, having the light receiving surface 4a, was selected, and even when there was a deviation between the distance measuring optical axis 1 and the prism optical axis 3, a predetermined measurement accuracy should have been maintained. Therefore, the yield was low on the photodetecting unit 4, and higher cost is required.

In the past, in the distance measuring instrument, which is capable of the prism measurement and the non-prism measurement, the amount of the reflection light from the object to be measured may differ extensively from each other. Therefore, it has been practiced to provide a light amount adjuster on the distance measuring light projecting optical system and to adjust the light amount of the distance measurement.

SUMMARY OF THE INVENTION

It is an object of the invention to provide a distance measuring instrument, which can perform the prism measurement and the non-prism measurement simply, and even when a deviation may occur between the distance measuring optical axis and the prism optical axis, such error can be prevented by a simple method.

To attain the above object, the present invention provides a distance measuring instrument, comprising a light emitting unit for emitting a distance measuring light, a photodetecting unit for receiving and detecting a reflected distance measuring light from an object to be measured and a part of the distance measuring light emitted from the light emitting unit as an internal reference light, a sensitivity adjusting unit for electrically adjusting photodetecting sensitivity of the photodetecting unit, and a control arithmetic unit for calculating a measured distance based on a photodetection signal of the reflected distance measuring light from the photodetecting unit and based on a photodetection signal of the internal reference light, wherein the control arithmetic unit can measure a distance by selecting a prism mode measurement and a non-prism mode measurement, and controls so that photodetecting sensitivity of the photodetecting unit is changed by the sensitivity adjusting unit in response to the selected measurement mode.

Also, the invention provides the distance measuring instrument as described above, wherein the control arithmetic unit selects the prism mode measurement, and the control arithmetic unit changes photodetecting sensitivity of the photodetecting unit by the sensitivity adjusting unit, depending on the measured distance in the prism mode measurement.

Further, the invention provides the distance measuring instrument as described above, wherein the prism mode measurement has a short distance measurement mode and a long distance measurement mode, and the photodetecting sensitivity of the photodetecting unit is set in advance with respect to the short distance measurement mode and the long distance measurement mode respectively.

Also, the invention provides the distance measuring instrument as described above, wherein the control arithmetic unit changes the short distance measurement mode and the long distance measurement mode based on a threshold value, and the threshold value when it is changed from the short distance measurement mode to the long distance measurement mode differs from the threshold value when it is changed from the long distance measurement to the short distance measurement mode.

Further, the invention provides the distance measuring instrument as described above, wherein the sensitivity adjusting unit impresses a bias voltage to the photodetecting unit and adjusts the photodetecting sensitivity of the photodetecting unit, and sets the bias voltage so as to be a value lower than a maximum value of S/N property, which is obtained when a signal intensity of the photodetecting unit, increasing or decreasing in response to the increase or the decrease of the bias voltage is divided by a noise intensity, increasing or decreasing in response to the increase or the decrease of the bias voltage.

Also, the invention provides the distance measuring instrument as described above, wherein in the prism mode measurement, the sensitivity adjusting unit decreases the photodetecting sensitivity of the photodetecting unit so that a measurement error will be equal to a predetermined value or lower in case a distance measuring optical axis of the distance measuring light is deviated over a predetermined amount with respect to an optical axis of a prism.

Further, the invention provides the distance measuring instrument as described above, wherein the bias voltage is between 70% and 95% of the bias voltage corresponding to the maximum value.

Also, the invention provides the distance measuring instrument as described above, wherein the bias voltage is set in such manner that in case the distance measuring optical axis is deviated over a predetermined amount, an error will be ½ of the measurement accuracy, which the distance measuring instrument has, about a measured value obtained under the condition that the distance measuring optical axis is consistent with the optical axis of the prism.

Further, the invention provides the distance measuring instrument as described above, wherein the deviation of the distance measuring optical axis is a deviation of ±1 minute when the prism is installed at a distance of 50 meters.

The present invention provides a distance measuring instrument, comprising a light emitting unit for emitting a distance measuring light, a photodetecting unit for receiving and detecting a reflected distance measuring light from an object to be measured and a part of the distance measuring light emitted from the light emitting unit as an internal reference light, a sensitivity adjusting unit for electrically adjusting photodetecting sensitivity of the photodetecting unit, and a control arithmetic unit for calculating a measured distance based on a photodetection signal of the reflected distance measuring light from the photodetecting unit and based on a photodetection signal of the internal reference light, wherein the control arithmetic unit can measure a distance by selecting a prism mode measurement and a non-prism mode measurement, and controls so that photodetecting sensitivity of the photodetecting unit is changed by the sensitivity adjusting unit in response to the selected measurement mode. As a result, a distance measuring instrument can be provided, by which it is possible to change over between the prism mode measurement and the non-prism mode measurement merely by simple electrical processing, and to carry out the prism mode measurement and the non-prism mode measurement in simple configuration and at lower cost.

Also, the invention provides the distance measuring instrument as described above, wherein the control arithmetic unit selects the prism mode measurement, and the control arithmetic unit changes photodetecting sensitivity of the photodetecting unit by the sensitivity adjusting unit, depending on the measured distance in the prism mode measurement. As a result, it is possible to perform the prism mode measurement even when light amount adjusting means is not provided on the distance measuring light projecting optical system.

Further, the invention provides the distance measuring instrument as described above, wherein the prism mode measurement has a short distance measurement mode and a long distance measurement mode, and the photodetecting sensitivity of the photodetecting unit is set in advance with respect to the short distance measurement mode and the long distance measurement mode respectively. As a result, it is possible to cope with the problems without adjusting light amount of the distance measuring light even when the light amount of the reflected distance measuring light differs between a short distance measurement and a long distance measurement.

Also, the invention provides the distance measuring instrument as described above, wherein the control arithmetic unit changes the short distance measurement mode and the long distance measurement mode based on a threshold value, and the threshold value when it is changed from the short distance measurement mode to the long distance measurement mode differs from the threshold value when it is changed from the long distance measurement to the short distance measurement mode. As a result, even when the object to be measured is present near either one of the threshold values, the measurement can be carried out stably.

Further, the invention provides the distance measuring instrument as described above, wherein the sensitivity adjusting unit impresses a bias voltage to the photodetecting unit and adjusts the photodetecting sensitivity of the photodetecting unit, and sets the bias voltage so as to be a value lower than a maximum value of S/N property, which is obtained when a signal intensity of the photodetecting unit, increasing or decreasing in response to the increase or the decrease of the bias voltage is divided by a noise intensity, increasing or decreasing in response to the increase or the decrease of the bias voltage. As a result, it is possible to perform the measurement stably even when changes may occur in the environmental condition of the measurement or when drift may arise in the electric circuit.

Also, the invention provides the distance measuring instrument as described above, wherein in the prism mode measurement, the sensitivity adjusting unit decreases the photodetecting sensitivity of the photodetecting unit so that a measurement error will be equal to a predetermined value or lower in case a distance measuring optical axis of the distance measuring light is deviated over a predetermined amount with respect to an optical axis of a prism. As a result, the measurement with high accuracy can be carried out even when the distance measuring optical axis is deviated from the prism, and the accuracy as required can be accomplished even without using the photodetecting unit of high quality, and it is possible to reduce the manufacturing cost.

BRIEF DESCRIPTION OF THE DRAWINGS

FIG. 3 (A) to FIG. 3 (F) each represents a table to show a relation between measurement errors generated in response to deviation of the distance measuring optical axis with respect to a prism, and the bias voltage to be impressed on the photodetecting unit.

DETAILED DESCRIPTION OF THE PREFERRED EMBODIMENT

Description will be given below on an embodiment of the present invention by referring to the attached drawings.

Figure 1:
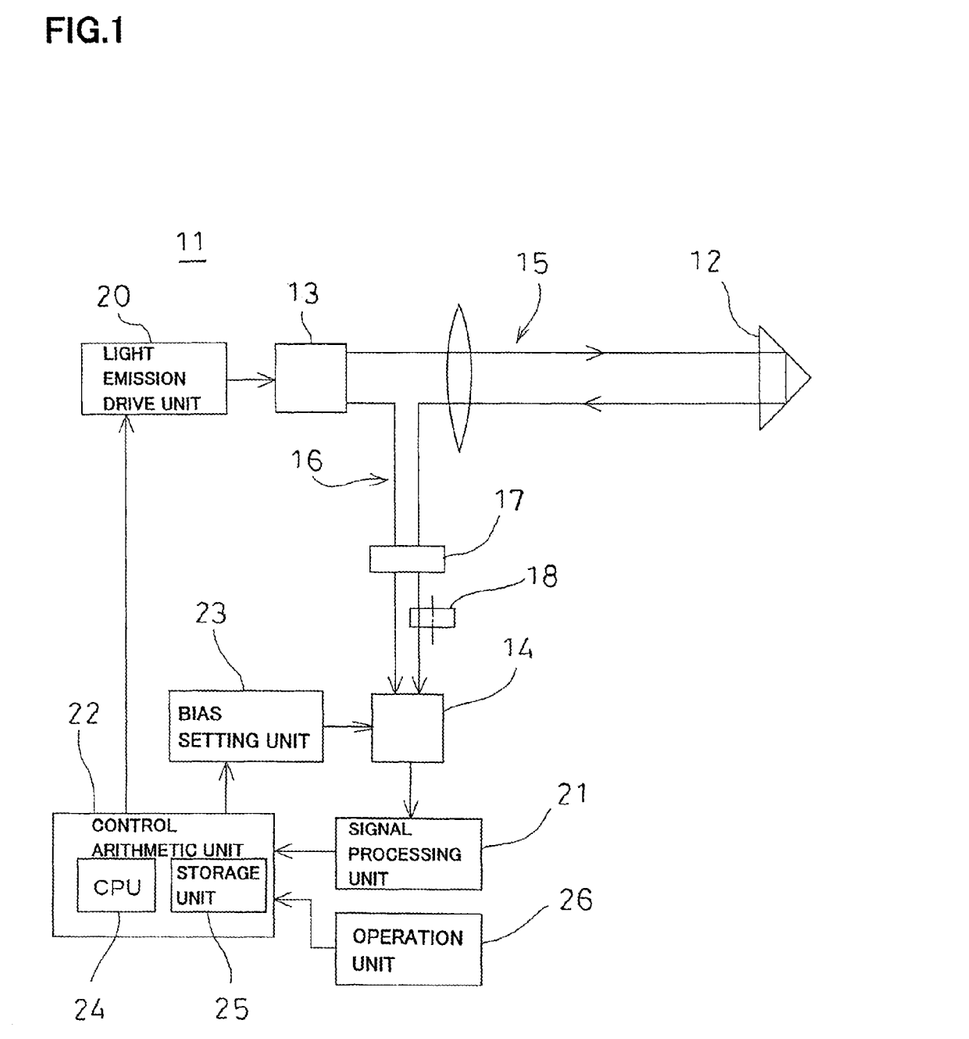
FIG. 1 is a schematical drawing to show general features of a distance measuring instrument according to an embodiment of the present invention.

Referring to FIG. 1, description will be given below on general features of a distance measuring instrument according to an embodiment of the present invention.

In FIG. 1, reference numeral 11 represents a distance measuring instrument, numeral 12 represents a prism used as an object to be measured, numeral 13 represents a light emitting unit such as a laser diode, numeral 14 represents a photodetecting unit such as an avalanche photo-diode (APD) or the like, numeral 15 represents a measuring optical path having a distance measuring optical axis 1 (see FIG. 4), and reference numeral 16 represents an internal reference optical path formed inside the distance measuring optical axis 1 and where a part of the distance measuring light is branched off as an internal reference light. An optical path changeover means 17 is provided to stride over the measuring optical path 15 and the internal reference optical path 16. By the optical path changeover means 17, optical path is alternatively selected, and it is selected whether a reflected distance measuring light enters the photodetecting unit 14 via the measuring optical path 15, or the internal reference light enters the photodetecting unit 14 via the internal reference optical path 16.

A light amount adjusting means 18 is disposed on the measuring optical path 15, and the light amount of the reflected distance measuring light is adjusted so that the light amount of the internal reference light and the light amount of the reflected distance measuring light will be the same or approximately the same. The light amount adjusting means 18 is a density filter, in which density is gradually varied in circumferential direction on a circular disk. The light amount adjusting means 18 may be so designed that a transmitting position of the internal reference light is changed by rotating the circular disk and the light amount can be adjusted, or that a plurality of apertures having different opening areas are provided, and an aperture where the reflected distance measuring light passes through is selected.

The light emitting unit 13 is emitted by a light emission drive unit 20. The emission of the light is controlled by the light emission drive unit 20. A photodetection signal from the photodetecting unit 14 is inputted to a signal processing unit 21. Then, the light is amplified and is processed by the processing as necessary such as amplifying, A/D conversion, etc., and the photodetection signal is inputted to a control arithmetic unit 22. The control arithmetic unit 22 is configured by a CPU 24, a storage unit 25, etc. An operation unit 26 is connected to the control arithmetic unit 22.

A bias setting unit 23, serving as a sensitivity adjusting unit, is electrically connected to the photodetecting unit 14. The bias setting unit 23 impresses bias voltage on the photodetecting unit 14 so that the photodetecting unit 14 can have photodetecting sensitivity as required.

In response to the bias voltage as impressed, a photodetection signal outputted from the photodetecting unit 14 is changed. When the bias voltage is increased, intensity of the photodetection signal is increased. Specifically, it is designed so that the sensitivity of the photodetecting unit 14 is increased with the increase of the bias voltage. On the other hand, noise included in the photodetection signal outputted from the photodetecting unit 14 has such property that the noise is rapidly increased as the bias voltage impressed on the photodetecting unit 14 is to be closer to the breakdown voltage. Here, the breakdown voltage means a voltage, at which the photodetecting unit 14 is turned to a state of saturation.

Figure 2:
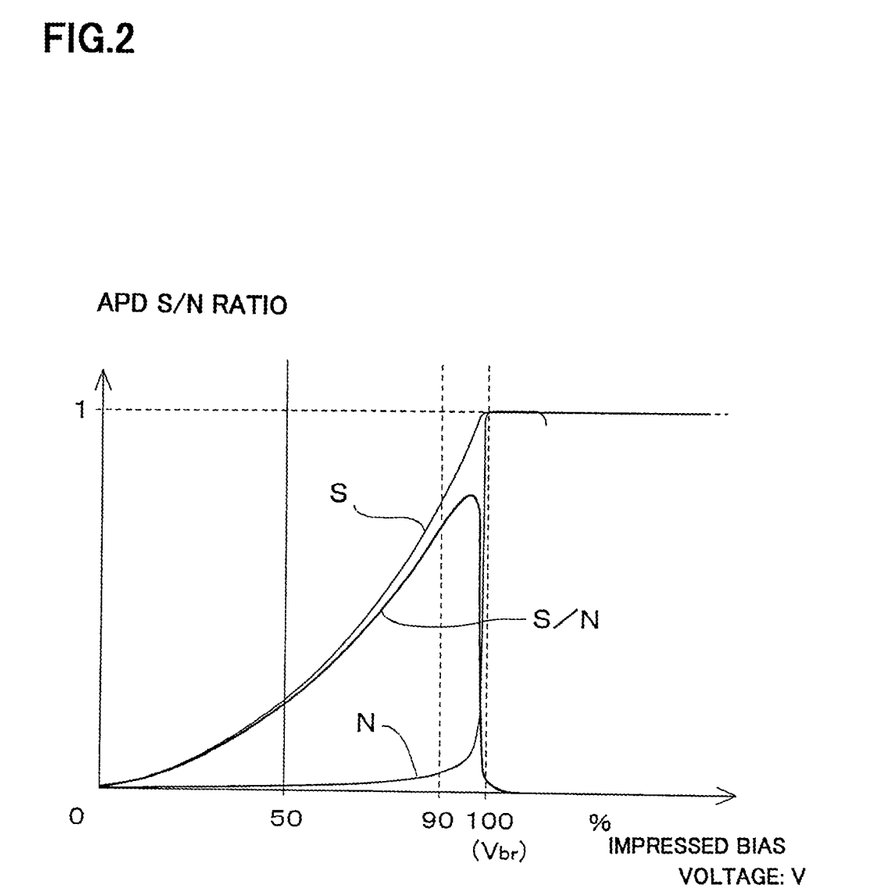
FIG. 2 is a graphic representation of a photodetecting unit in the embodiment, showing a relation of bias voltage to be impressed on the photodetecting unit, photodetection signal intensity, noise intensity, and ratio of photodetection signal intensity to noise intensity.
Figure 3A:
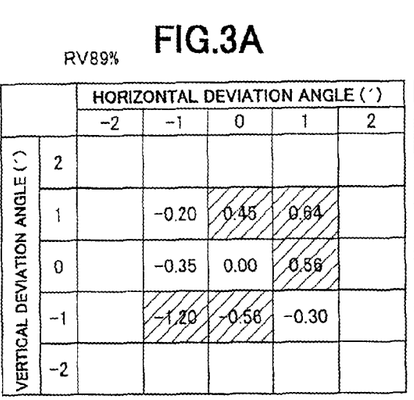
Figure 3B:
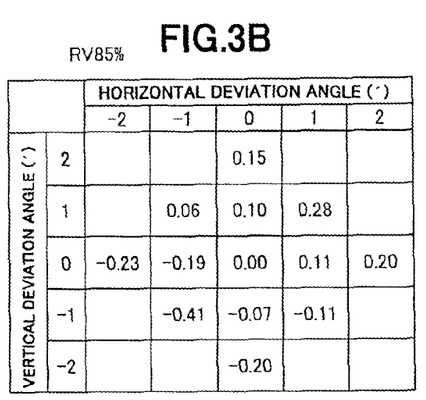
Figure 3C:
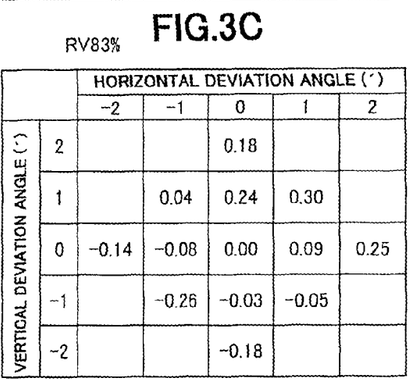
Figure 3D:
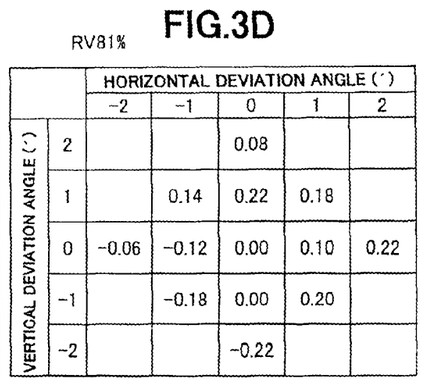
Figure 3E:
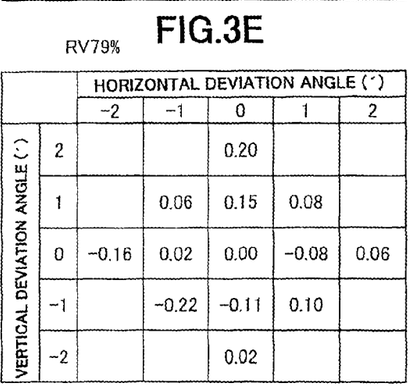
Figure 3F:
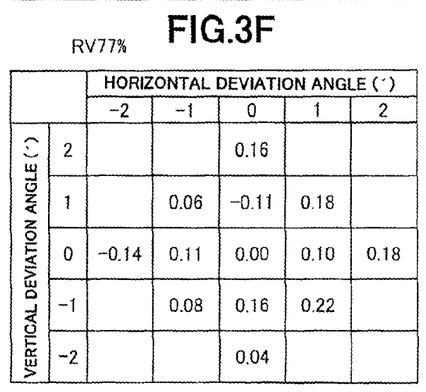

FIG. 2 shows generating conditions of the photodetection signal and the noise with respect to the impressed bias voltage in case where the photodetecting unit 14 is the avalanche photo-diode. In FIG. 2, a curve S represents a signal curve, a curve N represents a noise curve, and a curve S/N is a curve of a ratio of signal to noise obtained when the curve S is divided by the curve N. As shown in this figure, the curve S/N reaches the maximum value (hereinafter, bias voltage to match the maximum value is set to "an optimal bias voltage value") before the curve S/N reaches the breakdown voltage (Vbr). After reaching the maximum value, the curve S/N is suddenly set down and loses the function as the photodetecting unit 14.

When the photodetecting unit 14 is normally used, the optimal bias voltage value may change due to the reasons such as environmental temperature, drift of electric circuit, etc. By taking stability into account, a bias voltage slightly lower than the maximum value is impressed. In normal use, 90% voltage is impressed to the breakdown voltage.

As described above, at the photodetecting unit 14, the sensitivity or the responsiveness varies according to the bias voltage. Further, light receiving surface of the photodetecting unit 14 has a predetermined area, i.e. a limited area. As for micro-sized portion of the light receiving surface, the light receiving surface does not have the same photodetecting sensitivity, photodetecting sensitivity/bias voltage characteristics, and responsiveness over the total area of the light receiving surface (here, the expression "photodetecting sensitivity/bias voltage characteristics" means the change of photodetecting sensitivity associated with the change of bias, i.e. the S/N curve).

Therefore, when the bias voltage is changed, distribution of the photodetecting sensitivity or the responsiveness on the light receiving surface is changed. More detailed description will be give later on the changes of distribution of the photodetecting sensitivity and the responsiveness. As to be described later, in the present embodiment, it is based on the fact that the sensitivity of the photodetecting unit 14 is correlated with the bias voltage, and that distribution of the responsiveness of the photodetection signal on the light receiving surface is changed when the bias voltage is changed.

When the bias voltage is decreased, the responsiveness on the light receiving surface of the photodetecting unit 14 becomes uniform and even.

The control arithmetic unit 22 controls the light emission drive unit 20 and also controls light emitting condition of the light emitting unit 13 via the light emission drive unit 20. The control arithmetic unit 22 measures a distance to an object to be measured according to the reflected distance measuring light and the internal reference light as received by the photodetecting unit 14. Further, the control arithmetic unit 22 issues a control signal to the bias setting unit 23, controls the bias voltage to be impressed on the photodetecting unit 14 from the bias setting unit 23, and sets up or adjusts the sensitivity of the photodetecting unit 14.

In the storage unit 25, the following programs are stored: a prism mode measurement program for carrying out the measurement in prism mode, a non-prism mode measurement program for carrying out the measurement in non-prism mode, further, a short distance measurement mode program for measuring a short distance when the measurement is performed in the prism mode, a long distance measurement mode program for measuring a long distance, a bias voltage control program for controlling the bias voltage when the bias setting unit 23 impresses bias voltage, and other programs.

Further, the curve S and the curve N obtained in advance for the photodetecting unit 14 to be used, or the curve S/N or the curve S and the curve N and the curve S/N are set up and inputted in the storage unit 25, and a threshold value is set up and inputted, which changes over the short distance measurement mode and the long distance measurement mode when the measurement is performed in the prism mode.

Now, description will be given on operation of the present embodiment.

In the distance measuring instrument according to the present embodiment, the measurement can be performed in two modes: non-prism mode measurement and prism mode measurement. First, description will be given on the non-prism mode measurement. By the operation unit 26, the measurement mode is set to the non-prism mode measurement.

When no prism is installed on the object to be measured, a light amount of a reflection light from the object to be measured is low. Therefore, when it is set to the non-prism mode measurement, the control arithmetic unit 22 gives an instruction to the bias setting unit 23 so that a measurement maximum bias voltage should be impressed on the photodetecting unit 14. The measurement maximum bias voltage means the maximum bias voltage to be used for the measurement, and the measurement maximum bias voltage is a voltage of 90% of the breakdown voltage as described above.

A distance measuring light is emitted from the light emitting unit 13, and a part of the distance measuring light is split as an internal reference light. By the optical path changeover means 17, the measurement optical path 15 and the internal reference optical path 16 are selectively changed over. To the photodetecting unit 14, the reflected distance measuring light as directly reflected by the object to be measured and the internal reference light enter selectively. The internal reference light is adjusted by the light amount adjusting means 18 so that the internal reference light has the light amount, which is the same as or equal to the light amount of the reflected distance measuring light. In case the light amount of the reflected distance measuring light varies widely due to the distance to the object to be measured, and due to reflectivity, etc., the bias voltage is adjusted, and photodetecting sensitivity of the photodetecting unit 14 is adjusted so as to suit the conditions of the measurement.

Signal processing is performed on the photodetection signal at the signal processing unit 21, and the photodetection signal is inputted to the control arithmetic unit 22. At the control arithmetic unit 22, a distance to the object to be measured is determined according to the reflected distance measuring light and the internal reference light.

Next, description will be given on a case where the distance measurement is performed in the prism mode measurement. When the distance measurement is performed by the prism mode measurement, the measurement mode is set to the prism mode measurement by the operation unit 26.

In the prism mode measurement, the sensitivity of the photodetecting unit 14, i.e. bias voltage to be impressed on the photodetecting unit 14, is changed according to a measured distance as set in advance (a threshold value). Depending on the measured distance, various types of processing to change the bias voltage are thinkable. For instance, in case the measured distance is longer than the preset distance (i.e. in case the light amount of the reflected distance measuring light is lower), a higher bias voltage Va is set up. In case the measured distance is closer to the preset distance (i.e. in case the light amount of the reflected distance measuring light is higher), the lower bias voltage Vb is set up.

When the higher bias voltage Va is impressed on the photodetecting unit 14, the sensitivity of the photodetecting unit 14 is increased. When the lower bias voltage Vb is impressed on the photodetecting unit 14, the sensitivity of the photodetecting unit 14 is decreased.

As described above, the distribution of photodetecting/signal output characteristics is not the same over total area of the light receiving surface of the photodetecting unit 14, and there are individual differences of the photodetecting unit 14. Further, when the distance measuring optical axis has a deviation in the angle with respect to the optical axis of the prism 12, or in case the distance measuring optical axis is deviated from the center of the prism 2, the reflected distance measuring light is deviated from the distance measuring optical axis (see FIG. 4). As a result, the reflected distance measuring light also enters at a position deviated from the center of the photodetecting unit 14. Because the light receiving position of the photodetecting unit 14 is deviated from the center, distance measurement error occurs because of non-conformity of the distribution of responsiveness in the photodetection signal of the photodetecting unit 14.

FIG. 3 shows a condition of an error when a distance of 50 meters is measured as an example. In case an allowable error for a distance of 50 meters is set to 0.8 mm, it is shown that an error is required ½ of the allowable error or lower, i.e. 0.4 mm at one minute which is deviation (deviation angle [minute]) of distance measuring optical axis with respect to the prism.

In each of the tables shown in FIG. 3, a measured value is regarded as a standard value when a center square is consistent with the distance measuring optical axis, and measurement error in this case is regarded as 0. Further, FIG. 3 shows that it is deviated by one minute for each of the squares, and the up-to-bottom direction of the matrix corresponds to the vertical direction, and the left-to-right direction corresponds to the horizontal direction. The center square has a deviation angle which is 0 both in the vertical direction and in the horizontal direction, and the error in this case is set to 0. Each numerical value in the squares indicates an error to the measured value when the distance measuring optical axis is consistent (identical) with the prism optical axis, and the unit used here is mm.

Each of the tables shown in FIG. 3 shows a condition of an error corresponding to the deviation of the distance measuring optical axis when the bias voltage impressed on the photodetecting unit 14 is decreased to a level lower than the optimal bias voltage value. FIG. 3 (A) shows 89% of the breakdown voltage (RV), FIG. 3 (B) shows 85% of the breakdown voltage (RV), FIG. 3 (C) shows 83% of the breakdown voltage (RV), FIG. 3 (D) shows 81% of the breakdown voltage (RV), FIG. 3 (E) shows 79% of the breakdown voltage (RV), and FIG. 3 (F) shows 77% of the breakdown voltage (RV).

As shown in FIG. 3 (A), when the bias voltage is 89% of the breakdown voltage (i.e. when it is in normal condition to use), in the hatched square, the error exceeds the required error (±0.4 mm). For instance, in FIG. 3 (A), with a deviation of one minute (angle) in horizontal angle and a deviation of one minute (angle) in vertical angle, an error of 0.64 mm is caused.

Next, the conditions of occurrence of errors with respect to the deviation of the distance measuring optical axis is shown when the bias voltage to be impressed is set to 85%, 83%, 81%, 79% and 77% of the breakdown voltage respectively. In all of these cases, the error does not exceed the required error.

For instance, in FIG. 3 (B), when the deviation is one minute in horizontal angle and the deviation is one minute in vertical angle, the error is 0.28 mm, and this error satisfies the required error. In other words, by decreasing the bias voltage, the required accuracy can be met.

This phenomenon is not changed even when the bias voltage is decreased, and the error with respect to the deviation of the distance measuring optical axis does not exceed the required error. However, the sensitivity of the photodetecting unit 14 is decreased and a measurable distance will be shorter, and it seems that the limit of the bias voltage may be practically 70% of the break down voltage. Therefore, even in case of the photodetecting unit 14, which does not satisfy the required error in normal condition of use, the photodetecting unit 14 is turned to a usable condition by adjusting the bias voltage.

Further, there are individual differences in the photodetecting unit 14, and the maximum value and the bias voltage are not necessarily at a constant level. Accordingly, the bias voltage to be impressed should be selected to an adequate value of the bias voltage, which is between 95% and 75% of the optimal bias voltage.

As an actual bias voltage value, data should be acquired in advance on the photodetecting unit 14 to be installed on the distance measuring instrument 11, and the data are stored in the storage unit 25. As a result, a bias voltage VL for long distance measurement and a bias voltage VS for short distance measurement are stored in the storage unit 25. Then, the control arithmetic unit 22 controls the bias setting unit 23 so that the prism mode measurement is performed and the bias voltage corresponds to the short distance measurement mode and to the long distance measurement mode.

Next, description will be given below on the changeover between the short distance measurement mode and the long distance measurement mode in the prism mode measurement.

There are various thinkable factors when it is changed over between the short distance measurement mode and the long distance measurement mode. As a factor, the changeover may be judged by a light receiving light amount of the reflected distance measuring light received by the photodetecting unit 14, or may be judged by the distance. Further, in case where the changeover is performed due to the measured distance, if the distance measuring instrument has a focusing mechanism, a distance to the object to be measured may be obtained from focusing condition of the focusing mechanism. Description will be given below in case the results of the distance measurement as measured by the distance measuring instrument is used as an factor of the changeover between the short distance measurement mode and the long distance measurement mode.

In the present embodiment, there are two measured distances: a measured distance (a first threshold value) in case it is changed over from the short distance measurement mode to the long distance measurement mode, and a measured distance (a second threshold value) in case it is changed over from the long distance measurement mode to the short distance measurement mode. The threshold value varies between the case where it is changed over from the short distance measurement mode to the long distance measurement mode, and the case where it is changed from the long distance measurement mode to the short distance measurement mode. Thereby the stability of measurement can be improved when the object to be measured is present at a position closer to the threshold value.

Any of the first threshold value and the second threshold value may be bigger than the other. In short, it would suffice if the first threshold value and the second threshold value are different from each other.

The present invention can be applied to a distance measuring instrument in such as phase difference mode or pulse mode, in which the responsiveness of the light receiving surface of the photodetecting unit can exert influence.

The invention claimed is:

1. A distance measuring instrument, comprising
   a light emitting unit for emitting a distance measuring light,
   a photodetecting unit for receiving and detecting a reflected distance measuring light from an object to be measured and a part of the distance measuring light emitted from said light emitting unit as an internal reference light,
   a sensitivity adjusting unit for electrically adjusting photodetecting sensitivity of said photodetecting unit by adjusting a bias voltage impressed on said photodetecting unit, and
   a control arithmetic unit for calculating a measured distance based on a photodetection signal of the reflected distance measuring light from said photodetecting unit and based on a photodetection signal of the internal reference light,
   wherein said control arithmetic unit can measure a distance by selecting a prism mode measurement and a non-prism mode measurement, and said sensitivity adjusting unit controls the bias voltage so that photodetecting sensitivity distribution of said photodetecting unit is within the allowable error with respect to the selected measurement mode.

2. A distance measuring instrument according to claim 1, wherein said control arithmetic unit selects said prism mode measurement, and said control arithmetic unit changes said bias voltage of said photodetecting unit by said sensitivity adjusting unit, depending on the measured distance in said prism mode measurement.

3. A distance measuring instrument according to claim 2, wherein said prism mode measurement has a short distance measurement mode and a long distance measurement mode, and the bias voltage of said photodetecting unit is set in advance with respect to the short distance measurement mode and the long distance measurement mode respectively.

4. A distance measuring instrument comprising
   a light emitting unit for emitting a distance measuring light,
   a photodetecting unit for receiving and detecting a reflected distance measuring light from an object to be measured and a part of the distance measuring light emitted from said light emitting unit as an internal reference light,
   a sensitivity adjusting unit for electrically adjusting photodetecting sensitivity of said photodetecting unit, and
   a control arithmetic unit for calculating a measured distance based on a photodetection signal of the reflected distance measuring light from said photodetecting unit and based on a photodetection signal of the internal reference light,
   wherein said control arithmetic unit can measure a distance by selecting a prism mode measurement and a non-prism mode measurement, and controls so that photodetecting sensitivity of said photodetecting unit is changed by said sensitivity adjusting unit in response to the selected measurement mode
   wherein said control arithmetic unit selects said prism mode measurement, and said control arithmetic unit changes photodetecting sensitivity of said photodetecting unit by said sensitivity adjusting unit, depending on the measured distance in said prism mode measurement, wherein said prism mode measurement has a short distance measurement mode and a long distance measurement mode, and the photodetecting sensitivity of said photodetecting unit is set in advance with respect to the short distance measurement mode and the long distance measurement mode respectively, and wherein said control arithmetic unit changes the short distance measurement mode and the long distance measurement mode based on a threshold value, and the threshold value when it is changed from the short distance measurement mode to the long distance measurement mode differs from the threshold value when it is changed from the long distance measurement to the short distance measurement mode.

5. A distance measuring instrument according to claim 1, claim 2 or claim 3, wherein said sensitivity adjusting unit impresses a bias voltage to said photodetecting unit and adjusts the photodetecting sensitivity of said photodetecting unit, and sets said bias voltage so as to be a value lower than a maximum value of S/N property, which is obtained when a signal intensity of said photodetecting unit, increasing or decreasing in response to the increase or the decrease of said bias voltage is divided by a noise intensity, increasing or decreasing in response to the increase or the decrease of said bias voltage.

6. A distance measuring instrument according to claim 1, wherein in said prism mode measurement, said sensitivity adjusting unit decreases the photodetecting sensitivity of said photodetecting unit so that a measurement error will be equal to a predetermined value or lower in case a distance measuring optical axis of the distance measuring light is deviated over a predetermined amount with respect to an optical axis of a prism.

7. A distance measuring instrument according to claim 5, wherein said bias voltage is between 70% and 95% of the bias voltage corresponding to said maximum value.

8. A distance measuring instrument according to claim 6, wherein said bias voltage is set in such manner that in case said distance measuring optical axis is deviated over a predetermined amount, an error will be ½ of the measurement accuracy, which said distance measuring instrument has, about a measured value obtained under the condition that said distance measuring optical axis is consistent with the optical axis of said prism.

9. A distance measuring instrument according to claim 8, wherein the deviation of said distance measuring optical axis is a deviation of ±1 minute when said prism is installed at a distance of 50 meters.

10. A distance measuring instrument according to claim 5, wherein in said prism mode measurement, said sensitivity adjusting unit decreases the photodetecting sensitivity of said photodetecting unit so that a measurement error will be equal to a predetermined value or lower in case a distance measuring optical axis of the distance measuring light is deviated over a predetermined amount with respect to an optical axis of a prism.

* * * * *